United States Patent
Delmerico et al.

(10) Patent No.: US 6,819,087 B2
(45) Date of Patent: Nov. 16, 2004

(54) DISTRIBUTED RESOURCE (DR) STABILIZATION CONTROL FOR MICROGRID APPLICATIONS

(75) Inventors: Robert Delmerico, Clifton Park, NY (US); Gautam Sinha, Clifton Park, NY (US); Yan Liu, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 10/329,684

(22) Filed: Dec. 27, 2002

(65) Prior Publication Data

US 2004/0124812 A1 Jul. 1, 2004

(51) Int. Cl.[7] ............................................. H02P 9/10
(52) U.S. Cl. ......................... 322/58; 322/19; 322/23
(58) Field of Search ............................. 322/19, 23, 25, 322/32, 58, 99, 100

(56) References Cited

U.S. PATENT DOCUMENTS

| | | | | |
|---|---|---|---|---|
| 4,733,156 A | * | 3/1988 | Tanaka et al. ................. | 322/20 |
| 5,300,876 A | | 4/1994 | Takagi ......................... | 322/58 |
| 5,448,167 A | * | 9/1995 | Takagi ......................... | 324/177 |
| 5,483,147 A | * | 1/1996 | Ilic et al. ...................... | 322/25 |
| 5,604,420 A | * | 2/1997 | Nambu ......................... | 322/19 |
| 5,625,277 A | | 4/1997 | Khan et al. .................... | 322/58 |
| 5,698,968 A | * | 12/1997 | Takagi et al. ................. | 322/58 |
| 5,977,731 A | * | 11/1999 | Xia et al. ..................... | 318/147 |
| 6,057,672 A | * | 5/2000 | Xia et al. ..................... | 322/58 |
| 6,134,124 A | | 10/2000 | Jungreis et al. ............... | 363/34 |
| 6,175,210 B1 | | 1/2001 | Schwartz et al. ........... | 318/801 |
| 6,337,561 B1 | * | 1/2002 | Sudou et al. ................. | 322/19 |

* cited by examiner

Primary Examiner—Nicholas Ponomarenko
(74) Attorney, Agent, or Firm—Foley & Lardner LLP

(57) ABSTRACT

A power electronic based DR (distributed resource e.g., a UPS (uninterrupted power supply), Fuel Cell or Microturbine) is controlled to emulate a voltage source behind an impedance and behave as a power system stabilizer. The impedance in the DR is emulated and an estimate of impedance at the power/electronic interface is derived and applied to the control of the DR in a manner wherein the power and voltage swings on systems (loads) that otherwise would have difficulty with dynamic loads, are stabilized. Damping and synchronizing power are provided measuring only voltage, current and frequency at the interface between the DR and the load. The DR may include some energy storage.

14 Claims, 3 Drawing Sheets

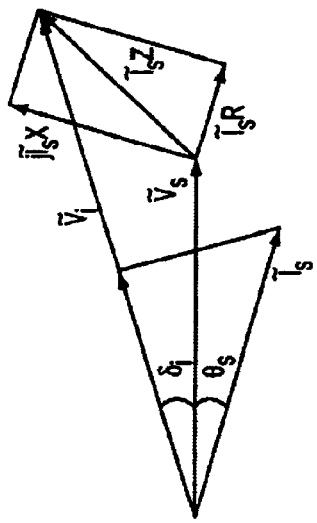

$V_i \angle \delta_i - V_s \angle 0 = I_s \angle \theta_s \times Z$     (1)

$Z = R + jX$     (2)

$V_i \cos\delta_i + jV_i \sin\delta_i - V_s = (I_s \cos\theta_s + jI_s \sin\theta_s) \times (R + jX)$     (3)

$\begin{cases} V_i \cos\delta_i - RI_s \cos\theta_s + XI_s \sin\theta_s = V_s & (4) \\ V_i \sin\delta_i - XI_s \cos\theta_s - RI_s \sin\theta_s = 0 & (5) \end{cases}$ $\begin{cases} I_{s1} = \sqrt{\dfrac{V_s^2 + V_i^2 - 2V_s V_i \cos\delta_i}{R^2 + X^2}} & (6) \\ I_{s2} = \dfrac{XV_i \sin\delta_i + RV_i \cos\delta_i - RV_s}{(R^2 + X^2)\cos\theta_m} & (7) \end{cases}$ $\begin{cases} I_s = \min(I_{s1}, I_{s2}) & (8) \\ \theta_s = \arcsin\left[\dfrac{RV_i \sin\delta_i - XV_i \cos\delta_i + XV_s}{(R^2 + X^2)I_s}\right] & (9) \end{cases}$

FIG. 2

DISTRIBUTED RESOURCE (DR) STABILIZATION CONTROL FOR MICROGRID APPLICATIONS

BACKGROUND OF THE INVENTION

This invention relates generally to the field of distributed resources (DR) and to the stabilization control of small grid (microgrid) applications. This invention more specifically relates to a control arrangement for a DR such as a microturbine, fuel cell arrangement or the like, which includes a power-electronic interface to the grid. The control enables the DR to be operated in a manner that stabilizes voltage and current supplied to a load/grid and provides a means to transition from grid connected to grid independent operation.

Following load fluctuations and system faults, rotating machine dynamics are governed by the machine mechanical dynamics, sometimes resulting in poorly damped frequency and angle power swing oscillations. Dynamic loads can also cause voltage stability problems. This behavior may limit system loading and may detrimentally affect power supply characteristics.

To solve the problem mentioned above in a cost effective way, utilities have used supplementary controls to stabilize their systems. In particular, power system stabilizers (PSS) have become a widely accepted method of improving the small-signal stability of electric power systems that is applied to the field exciter of a synchronous generator.

There are many considerations in applying PSS'S, and each PSS must be tuned according to the particular conditions of the host system. Other efforts have also been made to design power swing damping controllers such as FACTS controllers for power systems. However, most of the efforts are focused on bulk power systems, not for isolated, smaller sized power systems or so called "micro-grids" such as those provided on islands or applications where the distributed resources (DR) are a significant percentage of the total generation.

U.S. Pat. No. 5,300,876 discloses an example of the above mentioned type of PSS. The content of this document is hereby incorporated by reference thereto.

Another desirable feature lacking in power-electronic based DR equipment is the ability to smoothly transition from grid connected to grid independent operation with the DR supplying a dedicated load. The ability to transition in this manner, without loss of power to the load, is imperative in critical load applications such as might be found in data centers and some process lines.

SUMMARY OF INVENTION

A first aspect of the invention resides in a power-electronic based DR (distributed resource) control arrangement which causes the DR to emulate a voltage source with a specified output impedance and stabilize the load power, the control arrangement receiving signals indicative of current ($i_s$) and voltage ($v_s$) at an interface between the DR and the load, the control arrangement including circuitry which utilizes the signals indicative of interface current ($i_s$) and voltage ($v_s$) and which: generates an internal frequency and internal angle references; compares internal frequency reference with a measured power frequency; uses the frequency difference to modulate power command for damping control of load power oscillations; and determines a current magnitude and phase angle for DR output utilizing the specified emulated impedance.

A second aspect of the invention resides in a control arrangement associated with a DR (distributed resource) for controlling the DR on the basis of a voltage measurement signal ($v_s$) and a current measurement signal ($i_s$) from an interface between the load and the DR, the control arrangement comprising: a power control section which is responsive to the system voltage measurement signal ($v_s$) and the system current measurement signals ($i_s$), which generates a system frequency signal ($\omega_s$), a power measurement signal ($P_s$) and a system voltage signal ($V_s$) based on the system voltage measurement signal ($v_s$) and system current measurement signals ($i_s$), and which compares the system frequency signal ($\omega_s$) with a reference frequency signal ($\omega^*$) and system power measurement signal ($P_s$) to produce an internal power angle signal ($\delta_i$); and a voltage control section which determines an error between the system voltage signal ($V_s$) with a reference voltage ($v^*$) and produces an internal voltage signal ($V_i$).

A third aspect of the invention resides in a method of controlling a power electronic based DR (distributed resource) in a manner which emulates a voltage source behind an impedance and stabilizes power supplied to a load operatively associated with the DR, comprising: sensing system current ($i_s$) and system voltage ($v_s$), at the output of the DR, and based on the one or more of the signals indicative of system current ($i_s$) and system voltage ($v_s$) implementing the steps of: generating an internal frequency and internal angle references; comparing internal frequency reference with a measured power system frequency; using the frequency difference to modulate the power command for damping control of grid power oscillations; and determining, based on the specified impedance, a current and phase angle for DR output.

A further aspect of the invention resides in a method of controlling a DR (distributed resource) so as to behave as a power system stabilizer comprising the steps of: detecting a system voltage measurement signal ($v_s$), a system current measurement signal ($i_s$) and computing the system power measurement signal ($P_s$) at the DR output; using the system voltage measurement signal ($v_s$) and the system current measurement signal ($i_s$) to develop a system voltage signal ($V_s$); phase lock loop on system voltage signal ($v_s$) to produce a system frequency signal ($\omega_s$) and corresponding system frequency ramp signal ($\gamma_s$); modifying the system frequency signal ($\omega s$) with a reference frequency signal($\omega^*$) and the system power measurement signal ($P_s$) to generate a modified system frequency signal; frequency regulating the modified system frequency signal to develop a power reference signal ($P^*$); generating a phase correction signal by phase shifting a signal based on a difference between the system frequency signal($\omega s$) and the reference frequency signal($\omega^*$); modifying the power reference signal ($P^*$) with the phase correction signal; power regulating the modified power reference signal to develop an internal power angle signal($\delta_i$) and internal ramp signal ($\gamma_i$); regulating a voltage error signal derived using a reference voltage and generating an internal voltage signal ($V_i$); using the internal voltage system ($V_i$), the internal power angle signal ($\delta_i$) and the system voltage control signal $V_s$ to emulate a voltage source behind an impedance and to output a system current control signal ($I_s$) and a system angle control signal ($\theta_s$) indicative of the angle between the system current control signal ($I_s$) and the system voltage signal ($V_s$); modifying the system angle control signal ($\theta_s$) with the system frequency ramp signal ($\gamma_s$) and internal ramp signal ($\gamma_i$) to produce a modified system angle control signal ($\gamma_{so}$); and outputting the modified system angle control signal and the system current control signal ($I_s$) to the DR.

Yet another aspect of the invention reside in an apparatus for controlling a DR (distributed resource) so as to behave as a power system stabilizer, comprising: means for detecting a system voltage measurement signal ($v_s$) and a system current measurement signal ($i_s$) and calculating a system power measurement signal ($P_s$) from the DR; means for using the system voltage measurement signal ($v_s$) and the system current measurement signal ($i_s$) to develop a system voltage signal ($V_s$); means for on system voltage control signal ($v_s$) to produce a system frequency signal ($\omega_s$) and a system frequency ramp signal ($\gamma s$) indicative of the rotating angle of the system voltage ($v_s$); means for modifying the system frequency signal ($\omega s$) with a reference frequency signal($\omega^*$) and the system power measurement signal ($P_s$) to generate a modified system frequency signal; means for frequency regulating the modified system frequency signal to develop a power reference signal ($P^*$); means for generating a phase correction signal by phase shifting a signal based on a difference between the system frequency signal ($\omega s$) and the reference frequency signal ($\omega^*$); means for modifying the power reference signal ($P^*$) with the phase correction signal; means for power regulating the modified power reference signal to develop an internal power angle signal ($\delta_i$) and internal ramp signal ($\gamma_i$); means for regulating a voltage error signal derived using a reference voltage and generating an internal voltage signal ($V_i$); means for using the internal voltage system ($V_i$), the internal power angle signal ($\delta_i$) and the system voltage control signal $V_s$ to emulate a voltage source behind an impedance and to output a system current control signal ($I_s$) and a system angle control signal ($\theta_s$) indicative of the angle between the system current control signal ($I_s$) and the system voltage signal ($V_s$); means for modifying the system angle control signal ($\theta_s$) with the phase angle ramp signal ($\gamma_s$) and internal angle ramp signal ($\gamma_i$) to produce a modified system angle control signal ($\gamma_{so}$); and means for outputting the modified system angle control signal and the system current control signal ($I_s$) to the DR.

BRIEF DESCRIPTION OF THE DRAWINGS

FIG. 2 is the phasor diagram and associated equations depicting a feature of the control implemented in accordance with a preferred embodiment of the present invention.

DETAILED DESCRIPTION OF THE PREFERRED EMBODIMENTS

The invention is based on the use a power electronic based DR to provide better stabilization control of power supplied through a power supply line to a load. In accordance with this disclosure this load can take the form of devices/arrangements such as rotating devices (motors, synchronous or otherwise), other loads (heating, lighting, electronics or otherwise) or can be take the form of a grid which supplies power to the above mentioned types of devices which consume electrical power.

The power control in accordance with the embodiments of the present invention calculates the current injection magnitude and phase angle signals based on the emulated impedance and also provides the internal frequency and internal angle references on which control is determined. An internal frequency reference is compared with the measured power system frequency. The frequency difference is used for the damping control. The power output is controlled by the internal angle offset that is generated relative to the measured power system angle.

For a power electronic based DR unit, the dynamic behavior and stabilization is fully adjustable and determined by the control system structure and settings. This enables improved power quality and system loading capability.

The preferred embodiments of the present invention also provide a novel control topology that provides power swing damping. In addition, output impedance emulation for improved paralleling performance and a bumpless transition between grid parallel and grid independent modes of operation is also provided. In this disclosure the term grid parallel will be used to refer to a situation wherein a device and a grid are both connected to the DR, while the grid independent term is directed to the situation wherein the grid becomes disconnected and only the stand-alone load remains.

This avoids system shutdown wherein the DR control fails to adapt to the large changes in the characteristics of the power supply lines to which it is connected.

Figure 1:
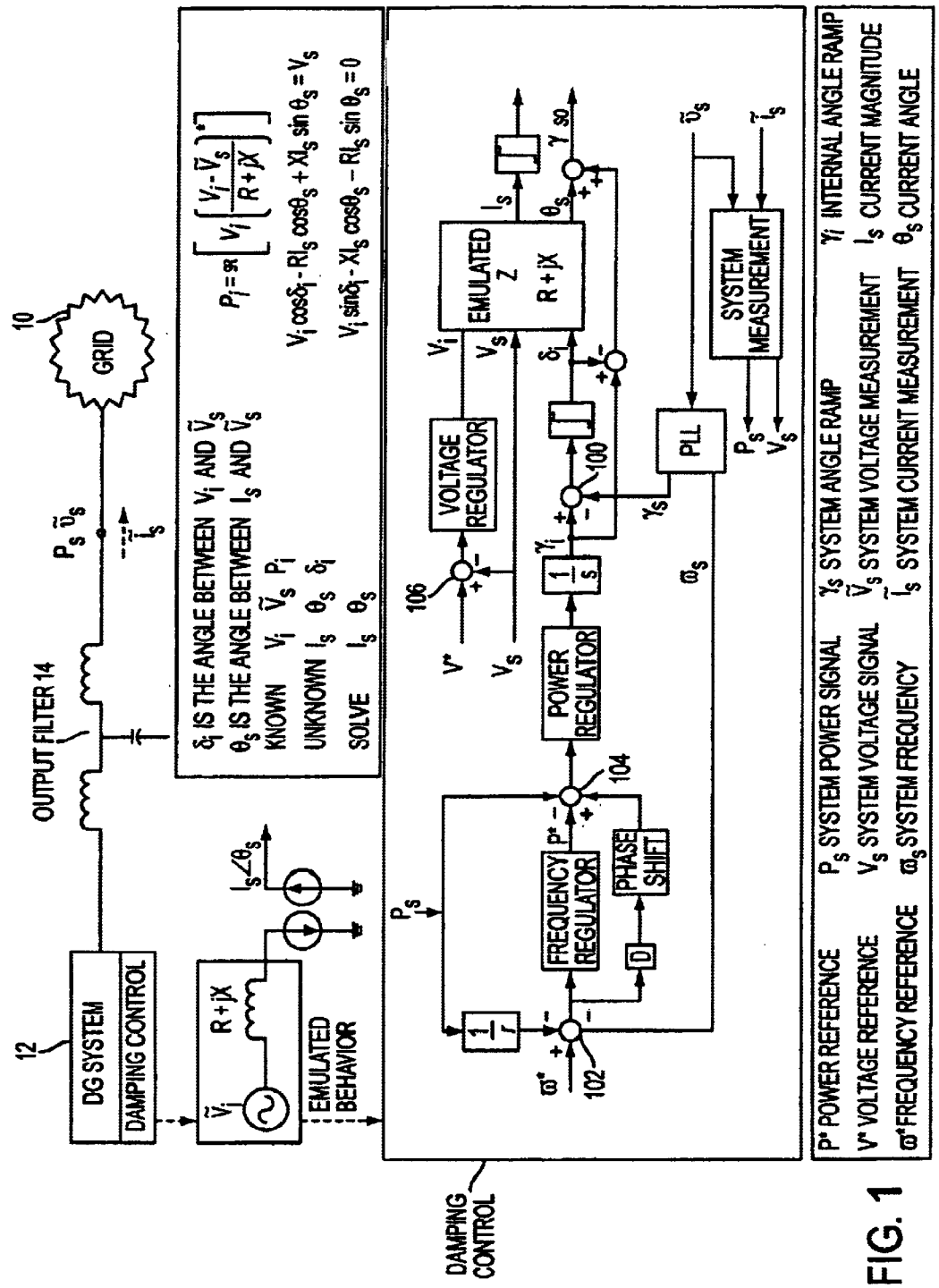
FIG. 1 is a schematic control block diagram that illustrates the essential regulators including damping control, frequency control, voltage control, power regulation, impedance emulation and current references.
Figure 3:
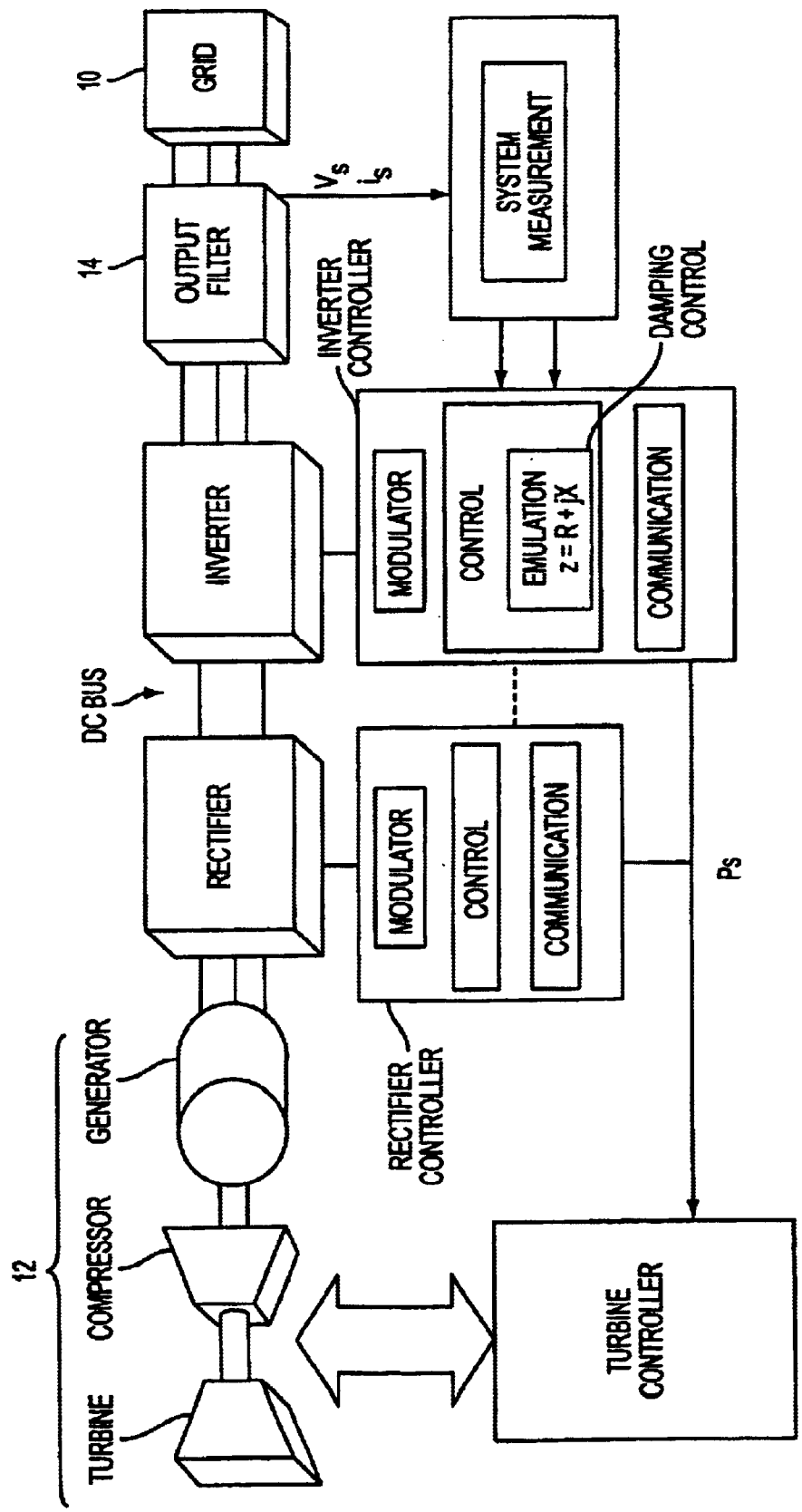
FIG. 3 is a block diagram showing a microturbine/generator arrangement to which the preferred embodiment of the present invention is applicable

FIG. 1 depicts the conceptual arrangement of a power electronic based DR arrangement which is provided with a control in accordance with a preferred embodiment of the present invention. As shown, in this arrangement the load to which power is supplied is depicted as being a grid 10. The load or grid as it will be referred to in connection with this embodiment is connected to a DG (distributed generation) system 12 via an output filter 14. The damping control which is used in this arrangement is depicted in the lower half of this figure and is such as to include frequency and power regulation sections which are coupled through an emulation unit to output controls to a device such as an inverter of a DR, for controlling a device such as schematically depicted in FIG. 3.

In more detail, damping control of the invention is implemented via processing data indicative of signals indicative of system voltage $v_s$ system current is and system power $P_s$ in a manner schematically illustrated in FIG. 1. More specifically the damping control operates as if system voltage $v_s$ and system current is are supplied to a system measurement circuit or block. These signals/values are tapped from the point of connection between the grid and the DR. The system measurement block or circuit outputs a system voltage control signal $V_s$ to a phase loop lock circuit (PLL). This PLL circuit outputs a system frequency signal $\omega_s$ to the frequency regulation section and a system angle ramp signal $\gamma_s$ to an adding/subtracting circuit 100.

The system frequency signal us and a reference frequency signal $\omega^*$ are supplied to an adding/subtracting circuit 102. The signal Ps indicative of system power that is output from the inverter control circuit (see FIG. 3) is supplied via a 1/r droop term circuit to the adding/subtracting circuit 102 and directly to an adding/subtracting circuit 104.

The function of the droop term in this instance is to function as a power frequency droop and to effect a control wherein if the frequency of the system is going up as a result of an upward power fluctuation, it is necessary to attenuate this rise by inducing a reduction in the system frequency reference and reducing the amount of power until the intended operating point is re-established.

The term 1/r is an empirically derived value and is, in essence, similar to those used in large turbine power plants.

It is known a priori and loaded into the controller at commissioning. This parameter can also be conceivably modified during operation by an external supervisory controller such as an energy management system/load management system.

A frequency regulator and a circuit containing series connected damping circuit gain (D) and a phase shift circuit, are connected in parallel between the two adding and subtracting circuits 102, 104.

If a system is disturbed (for instance, at a load-application event, or a loss of major load bus), because the power system is typically made up of a number of rotating machines, often synchronous machines interconnected by the network, because this is an electromechanical system, the generator's frequency actually tends to oscillate a bit around the nominal frequency 60 hertz.

This behavior can be damped using the proper control strategy of the generator or in this case, the DR. The DR controlled in accordance with the present invention can damp these power system oscillations by utilizing the damping gain (D) and the phase shift blocks to provide a phase shift between the system frequency that is measured ($\omega_s$) and the power that is being injected into the system. The proper phase shift in relationship with the power injection and the oscillating frequency, the oscillation around nominal 60 hertz, can be damped.

The frequency regulator is adapted to regulate toward a predetermined frequency such as 60 Hz, and outputs a power reference signal P* which is modified at the adding/subtracting circuit 104 by a phase shifted signal from the phase shift circuit. This offsets and compensates for system oscillation. These signals, in this instance, oscillate with a frequency of 1–2 Hz by way of example.

The output of the adding/subtracting circuit 104 is supplied to a power regulator circuit which in turns generates an internal power angle signal $\delta_i$ which is supplied to an emulation circuit. The power regulating circuit or block is adapted to function in a manner that ensures that commanded power is closed loop controlled and to ensure that is what is provided in the system. Once the speed or frequency is adjusted to its new operating point the power regulator will hold the power at its newly adjusted level.

A reference voltage signal V* and a system voltage control signal Vs are supplied to an adding/subtracting circuit 106. The error in voltage is supplied to a regulator which outputs an internal voltage signal Vi. This signal along with an unmodified Vs signal, are supplied to the emulation section along with the internal power angle signal $\delta$i.

This calculation is intended to be very fast and such that to the power system, it appears continuous. A more detailed discussion of the equations involved with the impedance determination and the issuance of the necessary control signals is given below with reference to FIG. 2.

After solving for $I_s$ and $\theta_s$ the emulation circuit outputs signals indicative of the values derived. The current signal is limited since power-electronics converters injecting currents into the grid have a maximum current magnitude that can be actually injected.

As will be appreciated from the phasor diagram of FIG. 2 the control provided by the circuit arrangement schematically depicted in FIG. 1 enables the calculation of the magnitude of current and angle for a current injection based upon the command $\delta_i$ and the command $V_i$. The only other item that is required is the measured terminal voltage and that essentially sets the phase rotation as well.

As schematically illustrated in FIG. 1, over the normal operating range the emulated behavior is such that it will behave as a voltage behind an impedance. What is shown in the phasor relationship is the measured system voltage (Vs) at the point of common coupling plus the impedance Z times the current flow, is actually, in this case, the measured current flow out of the DG. This provides us with a voltage drop behavior for this emulation that then sets the angle associated with $V_i$, at least relative to the measured system voltage.

Having established the necessary $V_i$ magnitude value and the angle $\delta_i$ between Vs and Vi the other parameter in the phasor diagram, i.e. measured current, is determined.

Proceeding through the equations which are set forth under the phasor diagram enables a visualization of the illustrated relationships and a derivation of the values which are required for control purposes. In these equations:

$\delta_i$ denotes the angle between $\tilde{V}_i$ and $\tilde{V}_s$;

$\theta_s$ denotes the angle between $\tilde{I}_s$ and $\tilde{V}_s$;

$V_i$ denotes internal voltage;

$\tilde{V}_s$ denotes system voltage measurement signal;

$I_s$ denotes system current control signal; and

R denotes the emulated resistance.

Z denotes the emulated impedance.

Equation (1)

$$V_i \angle \delta_i - V_s \angle 0 = I_s \angle \theta_s \times Z \quad (1)$$

expresses difference in the two voltages $V_i$ and $V_s$, being equal to the impedance times the current.

Equation (2):

$$Z = R + jX \quad (2)$$

is an expansion of the impedance.

Equation (3):

$$V_i \cos \delta_i + jV_i \sin \delta_i - V_s = (I_s \cos \theta_s + jI_s \sin \theta_s) \times (R + jX) \quad (3)$$

on the other hand, is an expansion of the first equation in the complex Cartesian coordinates. It is expanded showing angle magnitude and is translated into complex parameters—traditional phasor type equivalents Equations (4) and (5):

$$V_i \cos \delta_i - RI_s \cos \theta_s + XI_s \sin \theta_s = V_s \quad (4)$$

$$V_i \sin \delta_i - XI_s \cos \theta_s - RI_s \sin \theta_s = 0 \quad (5)$$

take the results of the third equation (equation 3) and separate out the real and imaginary parts as separate calculations. Based on this, we proceed to equations (6)–(9): Viz., $$I_{s1} = \sqrt{\frac{V_s^2 + V_i^2 - 2V_s V_i \cos \delta_i}{R^2 + X^2}} \quad (6)$$

$$I_{s2} = \frac{XV_i \sin \delta_i + RV_i \cos \delta_i - RV_s}{(R^2 + X^2) \cos \theta_m} \quad (7)$$

$$I_s = \min(I_{s1}, I_{s2}) \quad (8)$$

$$\theta_s = \arcsin\left(\frac{RV_i \sin \delta_i - XV_i \cos \delta_i + XV_s}{(R^2 + X^2)I_s}\right) \quad (9)$$

Equation (6) expresses the current magnitude $I_{S1}$ as a function of known elements, which would be the measured voltage, the internal voltage $V_i$, angle $\delta_i$, and the X and R values. This is the desired current magnitude when the DR is grid connected. Equation (7) expresses the current magnitude $I_{s2}$ as a function of known elements, which would be the measured voltage, measured current angle $\theta_m$, the internal voltage $V_i$, angle $\delta_i$, and the X and R values. This is the desired current magnitude when the DR is operated grid independent. Equation (8) selects between $I_{s1}$ and $I_{s2}$ to determine the actual current magnitude command $I_s$.

Following this, the final equation (equation (9)), wherein $\theta$ is derived using the arcsin of an expression that involves only X, R, the virtual voltage $V_i$, the measured system voltage $V_s$, and $I_s$ from equation (8).

Accordingly, equations (8) and (9) enable the desired parameters $I_s$ and $\theta_s$ to be translated into terms that are known and thus derived.

In the above equations, R and X are actually set point control parameters.

However, irrespective of the fact that the preceding disclosure has been made based on the assumption that the R and X values of equation (2) are preset and fixed, it is not outside the scope of the invention to vary these values during operation. For example, should a change occur in the grid such as a new feeder line being opened up, the values of these "none-variables" can be adjusted to taken into consideration changes which take place in the grid and thus improve the response and accuracy of the damping control which is enabled. It is also conceived that more that one set of series connected R and X values, all of which are different, can be implemeted simultaneously and used to calculate the current injection. This approach can be used if a more complex, frequency dependent, behavior is desired in some applications.

FIG. 3 schematically shows an embodiment of the invention wherein the control module is adapted for use with a microturbine. In this arrangement, the turbine is connected to a generator. The output of the generator is fed to rectifier. An inverter is connected to the rectifier through a DC bus. An output filter is interposed between the inverter and a grid. As shown, the control module, according to the present invention, is included in the inverter controller. The inverter controller computes the system power PS using data made available to by the system measurement circuit. The inverter controller passes this data to the rectifier controller and the turbine controller over a data network.

In summary the DR system is essentially a power-electronic device which interfaces with an electric power grid. The power-electronic inverter creates an AC current injection into a power supply line or grid. The emulated impedance control enables the current controlled source to behave like a voltage behind an impedance (R+jX). FIG. 1 shows designated as "Emulated Behavior" a voltage behind an impedance. This schematically indicates the overall arrangement of the preferred embodiments of the invention. Even though the power-electronic arrangement is typically a current controlled source that injects current into the power supply line or grid it assumes the guise of a voltage behind an impedance. The control concepts can also be adapted to power-electronic arrangements that are voltage controlled and interface to the power supply line or grid as voltage sources.

The emulated impedance is a very fast control loop. Accordingly, to the very fast dynamics of the grid, the DR system will appear as a voltage behind an impedance. Accordingly, this type of emulation will effectively allow a sharing of load or sharing of current between the DR and the grid, or the DR and another DR or DG, and a means for current sharing dynamically between elements of the power system.

The embodiments are not limited to the arrangement illustrated in FIG. 3 for example. Applications span from interconnecting the control embodiments with a large power system, at some local feeder level, to implementations where it is applied to a limited grid situation such as an island or what has been termed in recent years a micro grid, to the point of actually just having the DR and its own dedicated load with no other grid connections.

In the event that the embodiments of the invention were applied to a very large grid, current would be injected, typically by an independent power producer and hopefully collecting some credit same. Alternatively, the embodiments of the invention could be applied to a DR applied within an industrial facility or a commercial facility offsetting some of the local load, in manner wherein it is not large enough to inject power back into the grid, and is simply applied to offset local load.

The type of DR to which the present is applicable is not limited to a microturbine and can take the form of a fuel cell or cells, or a UPS (uninterruptible power supply), or any type of controlled power-electronic interface between an energy source and the grid, inasmuch as the invention is directed to smaller grid arrangements such as those which may found in a isolated arrangements such as an island or the like.

As noted above, the processing which has been described with reference to FIG. 1, is in the preferred embodiment of the invention intended to be carried out in an computer or processor by executing a program which emulates the processes/steps/calculations which have been set forth.

Although the present invention has been described with reference to only a limited number of embodiments, it will be understood that the invention is in fact, limited only by the appended claims and can encompasses any number of variations and modifications without departure from the scope of protection defined by said claims.

What is claimed is:

1. A power-electronic based DR (distributed resource) control arrangement which causes the DR to emulate a voltage source behind an impedance and stabilize power supplied to a load, the control arrangement receiving signals indicative of current ($i_s$), voltage ($v_s$) and calculated power ($P_s$) at an interface between the DR and the load, the control arrangement including circuitry which utilizes the signals indicative of interface current ($i_s$), voltage ($v_s$) and calculated power ($P_s$) and which:

generates an internal frequency and internal angle references;

compares internal frequency reference with a measured power frequency;

uses the frequency difference to modulate power command for damping control of load power oscillations;

determines a current magnitude and phase angle for DR output utilizing the specified emulated impedance.

2. A power-electronic based DR control arrangement as set forth in claim 1, wherein the load comprises a power supply grid.

3. A power-electronic based DR control arrangement as set forth in claim 1, wherein the load comprises a power supply line and at least one electrical device connected thereto.

4. A power-electronic based DR control arrangement as set forth in claim 1, wherein the load comprises a grid and a power supply one to which at least one electrical device is connected, connected in parallel.

5. A power-electronic based DR control arrangement as set forth in claim 1, wherein the load comprises a microgrid.

6. A power-electronic based DR control arrangement as set forth in claim 1, wherein the load comprises a large grid having a least one other power supply.

7. A control arrangement associated with a DR (distributed resource) for controlling the DR on the basis of a voltage measurement signal ($v_s$), a current measurement signal ($i_s$) and a calculated power measurement signal ($P_s$) from an interface between the load and the DR, the control arrangement comprising:

a power control section which is responsive to the system voltage measurement signal ($v_s$) and the system current measurement signals ($i_s$), which generates a system frequency signal ($\omega_s$) and a system voltage signal ($V_s$) based on the system voltage measurement signal ($v_s$), a voltage angle ramp ($\gamma_s$), and system current measurement signals ($i_s$), and which compares the system frequency signal ($\omega_s$) with a reference frequency signal ($\omega^*$) and modifies the system power measurement signal ($P_s$) to produce an internal power angle signal ($\delta_i$); and a voltage control section which determines an error between the system voltage signal ($V_s$) with a reference voltage ($v^*$) and produces an internal voltage signal ($V_i$).

8. A control system as set forth in claim 7, further comprising an impedance emulation section which is responsive to the internal power angle signal ($\delta_i$), the internal voltage signal ($V_i$) and the system voltage signal ($V_s$) and which outputs a system current control signal ($I_s$) and an angle control signal ($\theta_s$) which are used to control the distributed resource.

9. A control system as set forth in claim 7, wherein the power control section includes:

a frequency regulation circuit which responds to the difference between the system frequency signal ($\omega_s$) with a reference frequency signal ($\omega^*$) and produces a power reference signal ($P^*$); and phase shift loop which phase shifts a difference between the system frequency signal ($\omega_s$) with a reference frequency signal ($\omega^*$) and modifies the power reference signal ($P^*$) with the phase shifted difference and produces a correction in the internal power angle signal ($\delta_i$) which induces a frequency variation damping effect.

10. A control system as set forth in claim 7, wherein the impedance emulation section processes the internal power angle signal, the internal voltage signal and the system voltage signal on the basis of the following equations:

$$V_i \cos \delta_i - RI_s \cos \theta_s + XI_s \sin \theta_s = V_s \quad (1$$

$$V_i \sin \delta_i - XI_s \cos \theta_s - RI_s \sin \theta_s = 0 \quad (2$$

wherein:

$\delta_i$ denotes the angle between $V_i$ and $V_s$;

$\delta_s$ denotes the angle between $I_s$ and $V_s$;

$V_i$ denotes internal voltage;

$V_s$ denotes system voltage signal;

$I_s$ denotes system current magnitude control signal.

11. A control system as set forth in claim 7, wherein the frequency control section includes a system measurement circuit which receives the system voltage measurement signal ($v_s$) and the system current measurement signal ($i_s$) and outputs the system voltage signal ($V_s$) and system power ($P_s$); and a phase lock loop circuit which outputs the system frequency signal ($\omega_s$) and a system angle ramp signal ($\gamma_s$).

12. A method of controlling a power electronic based DR (distributed resource) in a manner that emulates a voltage source behind an impedance and stabilizes power supplied to a load operatively associated with the DR, comprising:

sensing system current ($i_s$) and system voltage ($v_s$), at the output of the DR, and based on the one or more of the signals indicative of system current ($i_s$) and system voltage ($v_s$) implementing the steps of:

generating an internal frequency and internal angle references;

comparing internal frequency with a measured power system frequency;

using the frequency difference to modulate power command for damping control of grid power oscillations;

determining, based on the estimated impedance, a current magnitude and phase angle for DR output.

13. A method of controlling a DR (distributed resource) so as to behave as a power system stabilizer comprising the steps of:

detecting a system voltage measurement signal ($v_s$) and a system current measurement signal ($i_s$) at the DR output;

using the system voltage measurement signal ($v_s$) and the system current measurement signal ($i_s$) to develop a system voltage control signal ($V_s$) and system power measurement signal ($P_s$);

using a phase lock loop on system voltage signal ($v_s$) to produce a system frequency signal ($\omega_s$) and a phase angle ramp signal ($\gamma_s$) indicative of the rotating phase angle of the system voltage ($v_s$);

modifying the system frequency signal ($\omega s$) with a reference frequency signal($\omega^*$) and the system power measurement signal ($P_s$) to generate a modified system frequency signal;

frequency regulating the modified system frequency signal to develop a power reference signal ($P^*$);

generating a phase correction signal by phase shifting a signal based on a difference between the system frequency signal($\omega s$) and the reference frequency signal($\omega^*$);

modifying the power reference signal ($P^*$) with the phase correction signal;

power regulating the modified power reference signal to develop an internal power angle signal ($\delta_i$);

Regulating an voltage error signal derived using a reference voltage and generating an internal voltage signal ($V_i$);

using the internal voltage system ($V_i$), the internal power angle signal ($\delta_i$) and the system voltage control signal $V_s$ to emulate a voltage source behind an impedance and to output a system current control signal ($I_s$) and a system angle control signal ($\theta_s$) indicative of the angle between the system current control signal ($I_s$) and the system voltage control signal ($V_s$);

modifying the system angle control signal ($\theta_s$) with the system frequency ramp signal ($\gamma_s$) and internal ramp signal ($\gamma_i$) to produce a modified system angle control signal ($\gamma_{so}$); and outputting the modified system angle control signal and the system current control signal ($I_s$) to the DR.

14. An apparatus for controlling a DR (distributed resource) so as to behave as a power system stabilizer, comprising:

means for detecting a system voltage measurement signal ($v_s$) and a system current measurement signal ($i_s$) from the DR;

means for using the system voltage measurement signal ($v_s$) and the system current measurement signal ($i_s$) to develop a system voltage control signal ($V_s$) and a system power measurement signal ($P_s$);

means to phase lock loop on system voltage control signal ($v_s$) to produce a system frequency signal ($\omega s$) and a phase angle ramp signal ($\gamma_s$) indicative of the rotating phase angle of system voltage ($v_s$);

means for modifying the system frequency signal ($\omega s$) with a reference frequency signal ($\omega^*$) and the system power measurement signal ($P_s$) to generate a modified system frequency signal;

means for frequency regulating the modified system frequency signal to develop a power reference signal ($P^*$);

means for generating a phase correction signal by phase shifting a signal based on a difference between the system frequency signal($\omega s$) and the reference frequency signal($\omega^*$);

means for modifying the power reference signal ($P^*$) with the phase correction signal;

means for power regulating the modified power reference signal to develop an internal power angle signal ($\delta_i$);

means for regulating an voltage error signal derived using a reference voltage and generating an internal voltage signal ($\delta_i$);

means for using the internal voltage system ($V_i$), the internal power angle signal ($\delta_i$) and the system voltage control signal $V_s$ to emulate a voltage source behind an impedance and to output a system current control signal ($I_s$) and a system angle control signal ($\theta_s$) indicative of the angle between the system current control signal ($I_s$) and the system voltage control signal ($V_s$);

means for modifying the system angle control signal ($\theta_s$) with the system frequency ramp signal ($\gamma_s$) and internal ramp signal ($\gamma_i$) to produce a modified system angle control signal ($\gamma_{so}$); and means for outputting the modified system angle control signal and the system current control signal ($I_s$) to the DR.

* * * * *

UNITED STATES PATENT AND TRADEMARK OFFICE
CERTIFICATE OF CORRECTION

PATENT NO. : 6,819,087 B2  Page 1 of 1
DATED : November 16, 2004
INVENTOR(S) : Robert Delmerico et al.

It is certified that error appears in the above-identified patent and that said Letters Patent is hereby corrected as shown below:

<u>Column 1,</u>
Line 4, insert the following paragraph:
-- STATEMENT REGARDING FEDERALLY SPONSORED RESEARCH & DEVELOPMENT
   This invention was made with Government support under U.S. Department of Energy contract number DE-FC02-00CH11063. The Government has certain rights in the invention. --.

Signed and Sealed this

Twenty-first Day of March, 2006

JON W. DUDAS
*Director of the United States Patent and Trademark Office*